United States Patent
Dériaz et al.

(10) Patent No.: US 10,655,693 B2
(45) Date of Patent: May 19, 2020

(54) MANUFACTURING METHOD FOR A COMPOSITE BRAKE DISC AS WELL AS A CORRESPONDING COMPOSITE BRAKE DISC

(71) Applicant: Ernst Grob AG, Männedorf (CH)

(72) Inventors: Daniel Dériaz, Meilen (CH); Niculo Steinrisser, Männerdorf (CH); Jan Schmid, Bubikon (CH)

(73) Assignee: ERNST GROB AG, Männedorf (CH)

( * ) Notice: Subject to any disclaimer, the term of this patent is extended or adjusted under 35 U.S.C. 154(b) by 0 days.

(21) Appl. No.: 15/778,004

(22) PCT Filed: Dec. 19, 2016

(86) PCT No.: PCT/CH2016/000157
§ 371 (c)(1),
(2) Date: May 22, 2018

(87) PCT Pub. No.: WO2017/106981
PCT Pub. Date: Jun. 29, 2017

(65) Prior Publication Data
US 2018/0372174 A1 Dec. 27, 2018

(30) Foreign Application Priority Data
Dec. 21, 2015 (CH) ........................................ 1886/15

(51) Int. Cl.
*F16D 65/12* (2006.01)
*B21H 1/02* (2006.01)
*F16D 65/02* (2006.01)

(52) U.S. Cl.
CPC ............. *F16D 65/123* (2013.01); *B21H 1/02* (2013.01); *F16D 2065/1304* (2013.01);
(Continued)

(58) Field of Classification Search
CPC ................. F16D 65/123; F16D 65/124; F16D 2065/1344; F16D 2065/1356;
(Continued)

(56) References Cited

U.S. PATENT DOCUMENTS 3,307,251 A * 3/1967 Magyar .................... F16F 15/32
29/406
3,661,235 A * 5/1972 Harrison ............... F16D 65/123
188/218 XL
(Continued)

FOREIGN PATENT DOCUMENTS

DE 102016115022 A1 * 2/2017 ............. F16D 65/12
GB 1 528 114 10/1978
(Continued)

OTHER PUBLICATIONS

English translation of International Preliminary Report on Patentability dated Jun. 26, 2018 (Jun. 26, 2018), Application No. PCT/CH2016/000157, 5 pages.
(Continued)

*Primary Examiner* — Thomas J Williams
(74) *Attorney, Agent, or Firm* — Rankin, Hill & Clark LLP

(57) ABSTRACT

A method for manufacturing a composite brake disc including a brake ring with at least one braking surface and a brake disc chamber having a tubular section and a base part that is connected to the tubular section and by way of which a reference plane is defined. The brake disc chamber and the brake ring are joined together, and a wobble angle between the at least one braking surface and the reference plane is reduced by reshaping the brake disc chamber.

14 Claims, 2 Drawing Sheets

Figure 1:
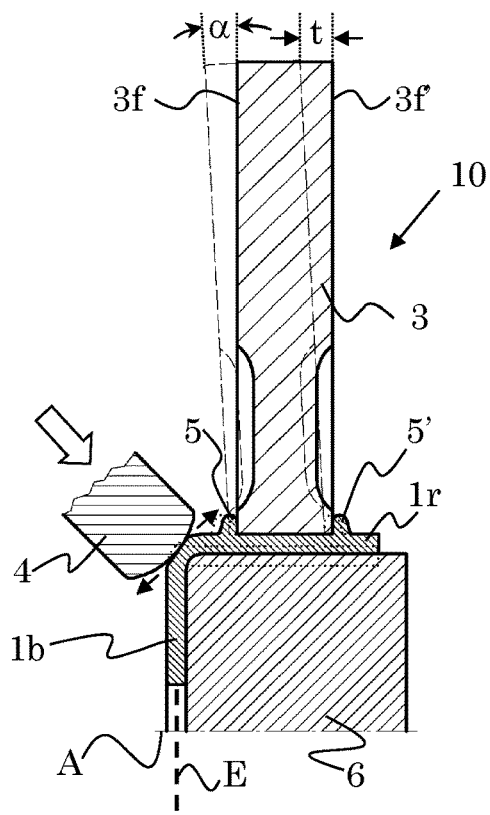

(52) U.S. Cl.
CPC ............ *F16D 2065/1344* (2013.01); *F16D 2250/0061* (2013.01); *F16D 2250/0084* (2013.01)

(58) Field of Classification Search
CPC ..... F16D 2065/1364; F16D 2065/1368; F16D 2250/0061; F16D 2250/0084; B21H 1/02
See application file for complete search history.

(56) References Cited

U.S. PATENT DOCUMENTS

| | | | |
|---|---|---|---|
| 5,988,324 A * | 11/1999 | Bertetti | B60B 27/0005 |
| | | | 188/18 A |
| 6,033,032 A | 3/2000 | Ruetter | |
| 6,035,978 A | 3/2000 | Metzen et al. | |
| 7,374,023 B2 * | 5/2008 | Yamamoto | F16D 65/12 |
| | | | 188/18 A |
| 7,784,592 B1 * | 8/2010 | Denstedt | F16D 65/0006 |
| | | | 188/18 A |
| 2016/0238095 A1 * | 8/2016 | Deriaz | F16D 65/123 |

FOREIGN PATENT DOCUMENTS

| | | | | |
|---|---|---|---|---|
| JP | 2005030471 A | * | 2/2005 | ............ F16D 65/12 |
| KR | 10-2013-0101796 | | 9/2013 | |
| WO | 2010/102704 | | 9/2010 | |

OTHER PUBLICATIONS

Korean Office Action dated Feb. 18, 2020, Application No. 10-2018-7020816; English translation included, 7 pages.

* cited by examiner

MANUFACTURING METHOD FOR A COMPOSITE BRAKE DISC AS WELL AS A CORRESPONDING COMPOSITE BRAKE DISC

BACKGROUND OF THE INVENTION

Field of the Invention

The invention relates to brake discs, more precisely to composite brake discs, as well as to a method for manufacturing composite brake discs and brake disc chambers for these. Composite brake discs are applied e.g. in the construction of vehicles, in particular in the construction of motor vehicles.

Description of Related Art

Composite brake discs are becoming increasingly applied above all in the construction of motor vehicles, since they can have a lower mass than conventional brake discs and can be manufactured more economically than conventional brake discs.

As is disclosed for example in WO 2010/102704 A1, a composite brake disc can include a brake disc chamber of sheet metal, in particular of steel sheet, and a brake ring of cast iron or other materials and even consist essentially of these two parts. Supplementarily, yet further elements such as, e.g., securing rings can be applied.

A brake disc chamber mostly includes a tubular section and a base part that connects thereto or consists of these two parts, wherein a brake disc chamber is mostly designed of a single piece. The tubular section can be designed cylindrically, but it can also be designed in a (slightly) conical manner.

The brake ring is sometimes also called a friction ring. It can be designed in a single-part manner, e.g. can be a casting. However, the brake ring can also be of several parts, e.g. of two parts and for example include an inner hub part and an outer braking part, wherein the hub part can be provided with an inner toothing and the braking part can be connected to the hub part by way of casting technology.

A braking moment that arises on the brake ring given a braking procedure is transmitted from the brake ring onto the brake disc chamber, e.g. via corresponding profilings or toothings in the brake ring and the brake disc chamber, more precisely in the tubular section of the brake disc chamber, so that it is also transmitted onto the base part of the brake disc chamber, from where the braking moment, typically by way of friction amid the application of screw bolts, can be transmitted onto the wheel hubs of vehicle wheels.

On manufacturing a composite brake disc, a brake ring is applied onto the tubular section, so that it encompasses this section. A movability of the brake ring relative to the tubular section in the radial as well as axial direction must be prevented. Furthermore, one is to additionally ensure that no tilting exists between the brake ring and the brake disc chamber, more precisely between the braking surfaces of the brake ring and the base part of the brake disc chamber. The brake ring, or more precisely its braking surfaces must (when the composite brake disc is finished) be aligned parallel to a reference plane, which is defined by the brake disc chamber (no or only a negligibly small wobble angle).

However, for composite brake discs, which are known from the state of the art, an unallowable axial run-out or wobble run-out can arise on pressing the brake disc chamber into the brake ring or on any other joining together of the brake disc chamber and the brake ring, due to the summing up of manufacturing tolerances. In order to be able to use such composite brake discs nevertheless, a post-machining takes place, in which (after joining together the brake disc chamber and the brake ring) the brake ring is machined in a material-removing manner, thus e.g. its braking surfaces are being turned over (face turning). This entails an additional working operation that leads to additional costs. Regarding coated brake rings, e.g. in the case of brake rings/braking surfaces that are ceramic-coated for increasing the service life, such a post-machining is maybe not possible at all or can only be carried out with great efforts.

SUMMARY OF THE INVENTION

It is an object of the invention to provide a new type of method for manufacturing a composite brake disc, in particular a method which permits composite brake discs to be manufactured with an adequately small axial run-out in an efficient way. A corresponding composite brake disc is also to be created.

A further object of the invention is to provide composite brake discs with a particularly small axial run-out (wobble).

A further object of the invention is to manufacture brake discs in relatively few manufacturing steps.

A further object of the invention is to manufacture composite brake discs in large numbers within a short time.

A further object of the invention is to compensate for manufacturing inaccuracies that occur on manufacture of composite brake discs, in particular in the case of manufacturing inaccuracies that can influence the axial run-out of the composite brake disc.

The method for manufacturing a composite brake disc relates to a composite brake disc including a brake ring and a brake disc chamber. The brake ring includes at least one braking surface. The brake disc chamber includes a tubular section and a base part that connects to this and by which a reference plane is defined. The previously separate parts—the brake disc chamber and brake ring—are joined together in the method. After the joining together, the brake disc chamber is reshaped, and a wobble angle existing between the at least one braking surface and the reference plane is reduced this way.

Accordingly, the wobble (and in particular: the maximal wobble) that the at least one braking surface has (with respect to the reference plane) is reduced by the (purposeful) reshaping of the brake disc chamber (the "reshaping" is also technically referred to as "forming").

It is to be assumed that the braking surface of the finished composite brake disc is to be aligned as accurately as possible perpendicularly to the reference axis. In the case that there are to be composite brake discs, with regard to which this would not be the case, another surface or plane of the brake ring would be taken as a reference for the wobble.

The wobble (and in particular the maximal wobble) can be determined for example by means of a sensor, typically in an outer-lying region of the at least one braking surface. The reshaping is carried out at least when the wobble (after the joining-together, before the reshaping) exceeds a predefined set value, e.g. 0.02 mm. In particular, the degree (strength) of the reshaping can be selected in a manner depending on the wobble (as determined by the sensor)

The alignment of the at least one braking surface with respect to the reference plane can be changed by the reshaping. The wobble (in particular the maximal wobble) and the wobble angle can be brought below a predefined set value.

A shape change of the brake disc chamber which is produced in a purposeful manner can effect the reduction of the wobble angle.

On reshaping, plastic deformations of the brake disc chamber can effect a permanent deformation of the brake disc chamber. Accordingly, a permanent, more accurate alignment of the at least one braking surface can be achieved.

In typical embodiments, the brake ring includes two braking surfaces that are aligned parallel to one another.

By joining together the brake disc chamber and the brake ring, these can be fixedly connected to one another or fastened to one another.

In some embodiments, the joining-together of the brake disc chamber and brake ring includes a creation of an axial securing for the brake ring on the tubular section. A movability of the brake ring in the axial direction (thus along a reference axis, which is perpendicular to the reference plane) can be limited or minimised by the axial securing.

In some embodiments, the joining-together of the brake disc chamber and the brake ring includes a creation of a rotational securing for the brake ring on the tubular section. A movability (rotatability) of the brake ring about a reference axis, which is perpendicular to the reference plane, can be restricted or minimised by the rotational securing.

In some embodiments, the reshaping includes the brake disc chamber being reshaped by way of at least one tool. For this, the at least one tool can be brought into engagement with the brake disc chamber.

In some embodiments, a force introduction direction of a force that is exerted by the at least one tool for effecting the reshaping is aligned perpendicularly to a surface that is machined by the tool (surface of a reshaping region).

In some embodiments, a reference axis, which is perpendicular to the reference plane, is defined by the base part and a tube axis is defined by the tubular section. A tilt angle between the tube axis and the reference axis can be changed by the reshaping of the brake disc chamber. However, in practise such a tilt angle is very small.

The tubular section (more precisely: the tube axis) can be aligned exactly perpendicularly to the base part (more precisely: to the reference plane) before the joining-together of the brake ring and the brake disc chamber. By the reshaping of the brake disc chamber, it can then be effected that this alignment is no longer exactly perpendicular, and specifically such that the alignment of the at least one braking surface is improved (reduced wobble, reduced wobble angle).

In some embodiments, the brake ring (after the joining-together) is in contact with the tubular section in a fastening region, and the reshaping of the brake disc chamber takes place within an axial region which extends from an end of the fastening region at the base part side, up to and including the base part.

In some embodiments, the tubular section includes an axial stop. This can be part of an axial securing. In particular, the reshaping of the brake disc chamber can take place within an axial region which extends from the axial stop up to and including the base part.

Herein, in some embodiments the axial stop can be an axial stop located at the base part side (base-part-side axial stop). For example, on the joining together, the brake ring can be pushed onto the tubular section up to the axial stop. In such embodiments, e.g., it can be provided that for the tubular section to includes a further axial stop, wherein the base-part-side axial stop, with respect to its axial position, is arranged between the base part and the further axial stop.

In other embodiments, the brake ring includes two braking surfaces, and the axial stop is provided at a radial position which lies between the radial positions of the two braking surfaces. E.g., in such embodiments, the axial stop can be simultaneously created with the creation of an outer profiling of the brake disc chamber by shaping a brake disc chamber blank into in inner profiling of the brake ring.

In some embodiments, the reshaping of the brake disc chamber takes place within a transition region between the base part and the tubular part. For example, the transition region can form a rounded and/or angled connection between the base part and the tubular section.

In some embodiments, the reshaping of the brake disc chamber takes place within the tubular section. E.g., the reshaping can take place within the tubular section between the base part and the axial stop which is mentioned above.

In typical embodiments, a degree of the reshaping of the brake disc chamber varies over the circumference of the brake disc chamber, more precisely: along a circumferential coordinate. The circumference or the circumferential coordinate (or also azimuth, azimuthal coordinate) is given by the reference axis.

The degree of the reshaping can therefore vary azimuthally.

In particular, the variation of the degree of the reshaping can be selected in dependence on a variation of the wobble. E.g., the variation of the degree of the reshaping can be mirror-symmetrical to a plane that contains the reference axis and the azimuthal direction of the maximal wobble. One can envisage the degree of the reshaping being maximal in a first region of maximal wobble and the degree of the reshaping being minimal in a second region of maximal wobble.

In some embodiments, the reshaping includes a single reshaping step. In this step, e.g., an azimuthal region (with respect to the reference axis) of the brake disc chamber that encompasses at least 180° can be reshaped.

In other embodiments, the reshaping includes the successive implementation of a plurality of reshaping steps.

For example, the brake disc chamber can be successively reshaped in different azimuthal regions. Herein, the degree of the reshaping steps can vary with the respective azimuthal direction.

The deformation of the brake disc chamber that is produced by the reshaping can be a continuous deformation. In other embodiments, the deformation of the brake disc chamber that is produced by the reshaping can include several azimuthally distributed individual deformations.

In some embodiments, the reshaping includes the brake disc chamber being plastically deformed by at least one tool.

In some embodiments, the brake disc chamber is machined from the inside (thus at its inner side) by the at least one tool.

In some embodiments, the brake disc chamber is machined from the outside (thus at its outer side) by the at least one tool.

In some embodiments, the reshaping includes a cold-forming procedure.

In some embodiments, the reshaping includes a pressing procedure.

In some embodiments, the reshaping includes a rolling procedure.

In some embodiments, the reshaping includes a stamping procedure.

In some embodiments, the reshaping includes a spinning procedure.

In some embodiments, the reshaping includes a flow turning procedure.

The reshaping can also include combinations of two or more of the mentioned procedures.

For example, spinning rollers and/or pressing tools and/or cogs and/or hammers are considered as tools.

In some embodiments, the reshaping entails at least one indentation being produced in the brake disc chamber. For example, a tool can be brought into engagement with the brake disc chamber at one side (inner side or outer side) of the brake disc chamber, whilst a counter-holder is in contact with the brake disc chamber at the opposite side (outer side or inner side) of the brake disc chamber, wherein the counter-holder is only in contact with the brake disc chamber outside a reshaping region, in which the brake disc chamber is reshaped by the at least one tool. The shape of the brake disc chamber can be changed and an indentation can arise by way of this, whilst a material thickness of the brake disc chamber in the reshaping region can remain (at least essentially) constant in this case.

The brake disc chamber can be contracted in a quasi local manner by way of the production of an indentation, so that the brake ring is tilted in the direction of the indentation in the azimuthal region, in which the indentation is located.

In some embodiments, the reshaping entails a wall thickness of the brake disc chamber being locally reduced.

For example, a tool can be brought into engagement with the brake disc chamber at one side (inner side or outer side) of the brake disc chamber, whilst a counter-holder is in contact with the brake disc chamber at the opposite side (outer side or inner side) of the brake disc chamber, wherein the counter-holder is in contact with the brake disc chamber in a reshaping region, in which the brake disc chamber is reshaped by the at least one tool. The material thickness of the brake disc chamber can be reduced by way of this. An occurrence of an indentation (which would relate to the inner wall as well as to the other wall of the brake disc chamber) can therefore be prevented.

The material of the brake disc chamber can be displaced and flow away due to the reduction of the wall thickness, so that the brake disc chamber can be quasi locally stretched. Accordingly, by way of this, the brake ring can be tilted in a direction pointing away from the reshaping region, in the azimuthal region in which the reshaping region is located.

A sensor, e.g. a distance sensor, can be used in order to determine the wobble and/or the (azimuthal) directions of maximal wobble.

In some embodiments, a measure for a wobble of the at least one braking surface relative to the reference plane is determined by means of a sensor. It is then possible to carry out the reshaping of the brake disc chamber in dependence on the determined measure.

The mentioned measure for the wobble can, e.g. be the wobble itself or a variable which is proportional to the wobble.

In some embodiments, the tubular section includes an outer profiling, and the brake ring includes a corresponding inner profiling. The outer profiling and the inner profiling can mesh into one another for forming a rotational securing (securing of the braking ring on the brake disc chamber against mutual rotation).

E.g., it can be provided that the outer profiling and the inner profiling already exist and mesh into one another on joining together the brake disc chamber and the brake ring. In other embodiments, a brake disc chamber blank is brought into a brake ring, which is provided with an inner profiling, and the brake disc chamber blank is shaped into the inner profiling by way of at least one stamping tool, and the inner profiling produced this way.

In some embodiments, the reshaping takes place in the region of the outer profiling of the brake disc chamber.

In some embodiments, the reshaping takes place in a region outside the outer profiling of the brake disc chamber.

The composite brake disc can be a composite brake disc, which has been manufactured according to the described method.

In particular, from a first additional viewpoint, the composite brake disc can be a composite brake disc, which includes a brake ring with at least one braking surface and a brake disc chamber, wherein the brake disc chamber includes a tubular section and a base part, the base part being connected to the tubular section and defining a reference plane and a reference axis, which is perpendicular to the preference plane.

Furthermore, the brake disc chamber, from the first additional viewpoint, includes a deformation pattern, which:
- includes deformations of the brake disc chamber of a maximal degree in the region of a first radial direction;
- includes deformations of the brake disc chamber of a minimal degree in the region of a second radial direction, which is opposite to the first radial direction;
- includes deformations of the brake disc chamber, whose degree reduces with an increasing angular distance from the first direction down to a minimal degree, in regions of radial directions that lie between the first and the second radial direction.

Herein, the minimal thickness can be zero or also different to zero.

The radial directions relate to the reference axis, thus to directions that run perpendicularly to the reference axis.

A purposeful tilting of the brake ring can be effected by means of the deformation pattern, so that a wobble present at the beginning is reduced.

For clarification: The details given above on (radial) directions regarding the deformation pattern relate to positions (more precisely: azimuthal positions, azimuthal coordinates) of deformations of a certain degree, but not to directions of force actions which lead to the deformations.

From a second additional viewpoint, which can be combined with the first additional viewpoint, the composite brake disc includes a brake ring with at least one braking surface and a brake disc chamber, wherein the brake disc chamber includes a tubular section and a base part, the base part being connected to the tubular section and defining a reference plane and a reference axis, which is perpendicular to the reference plane. A tube axis is defined by the tubular section. A wobble angle (which has been reduced, e.g., by the described method) between the at least one braking surface and the reference plane is smaller than a tilt angle between the tube axis and the reference axis.

In this case, the wobble angle is small in a way, whilst accepting an increased tilt angle.

The first and the second radial direction can lie in a plane that includes the tilt angle.

The brake disc chamber and the brake ring can be individual parts that are joined together.

In some embodiments, the deformation pattern includes an indentation or several indentations in the brake disc chamber.

In some embodiments, the deformation pattern includes a region or several regions of a reduced material thickness of the brake disc chamber. Herein, the "reduction of the material thickness" in particular can relate to a material thickness in the reshaping region relative to a material thickness in a region which is adjacent to the reshaping region.

It is to be noted that the embodiment variants, which are described above, can each be combined with one or more of the other described embodiment variants. This applies to the composite brake disc as well as to the method.

And the invention can also include methods with features which result from the features of described composite brake discs, as well as composite brake discs with features which result from the features of the described devices.

Further embodiments and advantages can be derived from the dependent patent claims.

Figure 2:
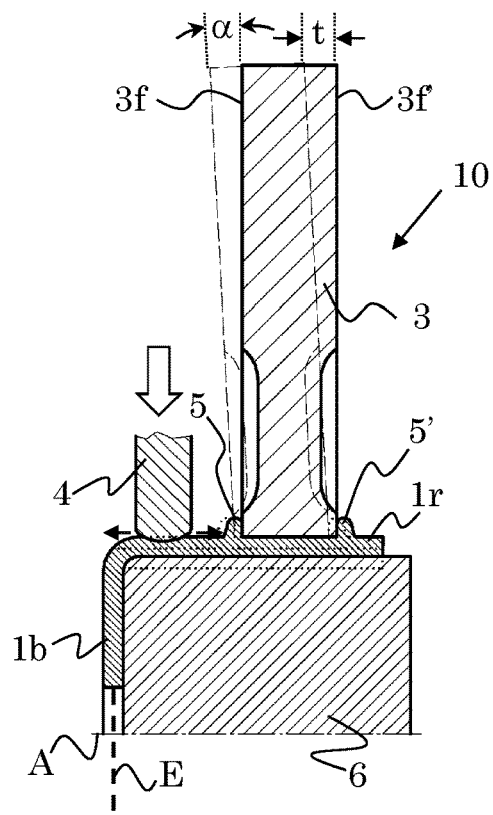
Figure 3:
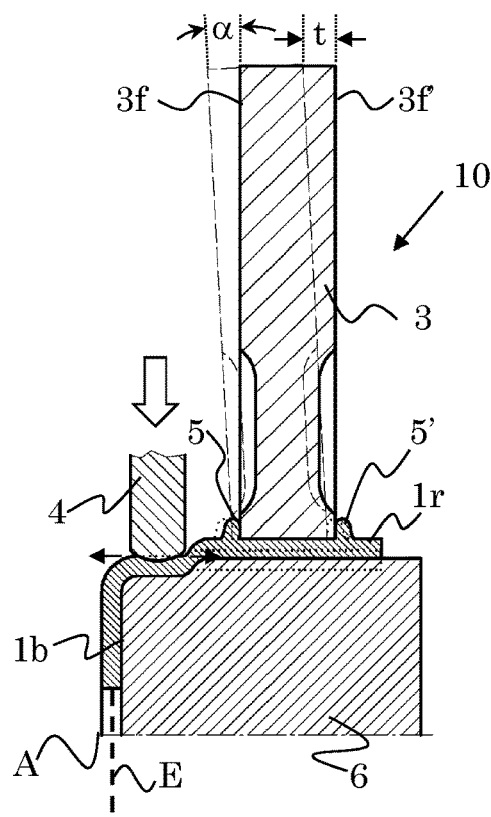
Figure 4:
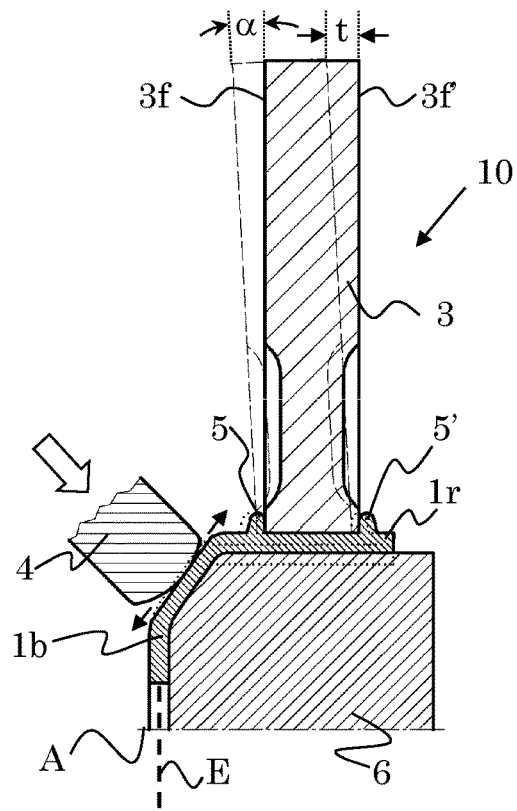
Figure 5:
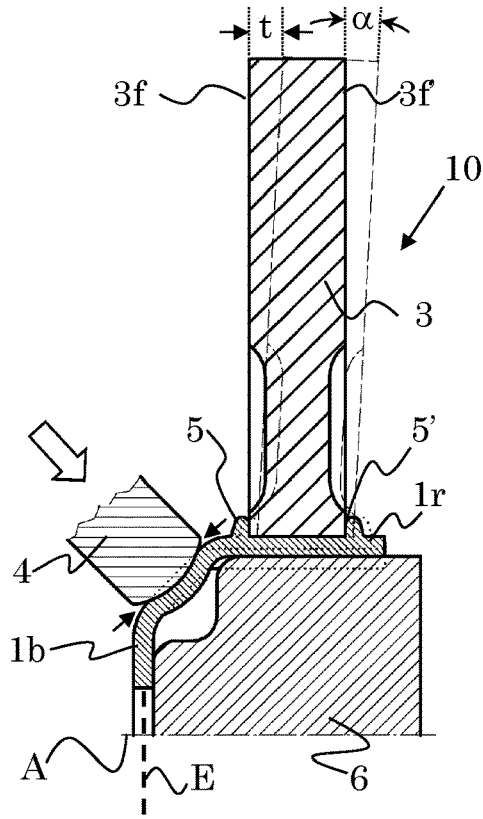
Figure 7:
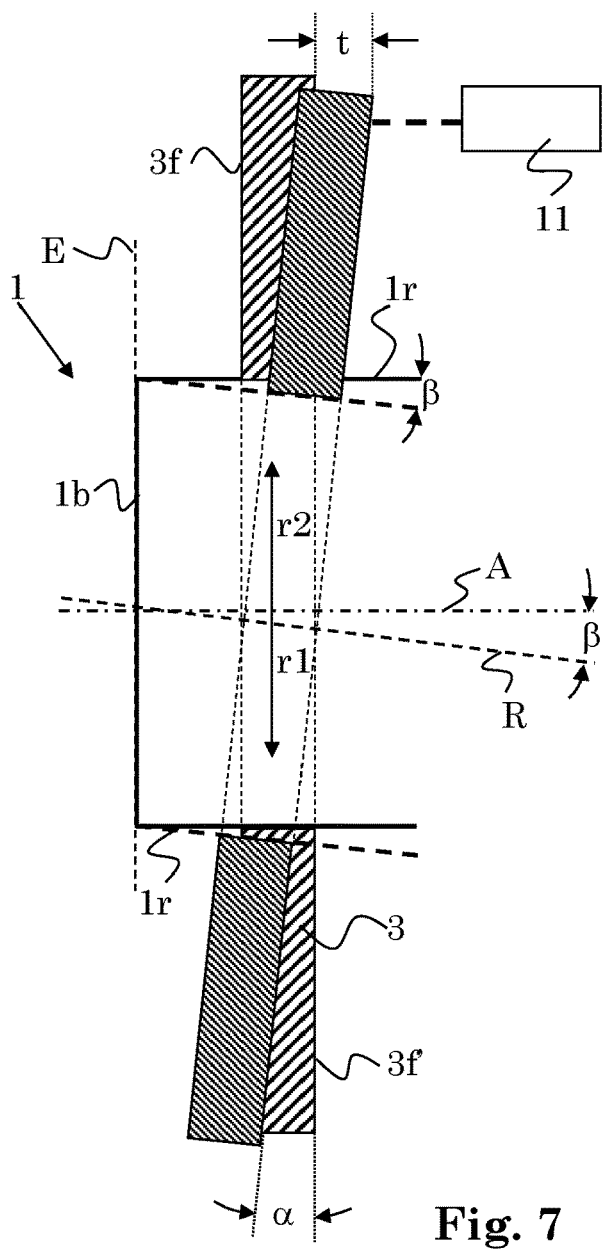
Figure 6A:
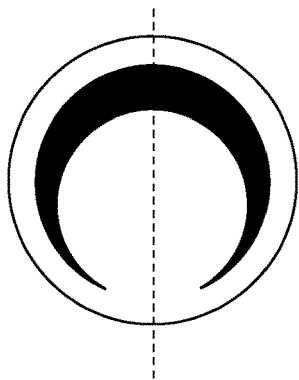
Figure 6B:
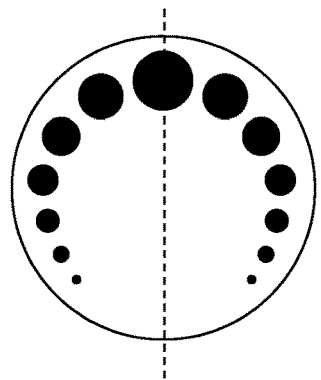
Figure 6C:
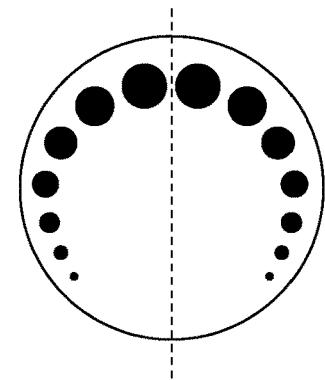

The subject-matter of the invention is hereinafter explained in more detail by way of embodiments and the accompanying drawings. There are shown in:

FIG. 1 a detail of a composite brake disc which is being machined, in a section that runs through the reference axis;

FIG. 2 a detail of a composite brake disc which is being machined, in a section that runs through the reference axis;

FIG. 3 a detail of a composite brake disc which is being machined, in a section that runs through the reference axis;

FIG. 4 a detail of a composite brake disc which is being machined, in a section that run through the reference axis, FIG. 5 a detail of a composite brake disc which is being machined, in a section that runs through the reference axis;

FIG. 6A a schematic illustration of a continuous deformation pattern;

FIG. 6B a schematic illustration of a sectoral (discontinuous) deformation pattern;

FIG. 6C a schematic illustration of a sectoral (discontinuous) deformation pattern;

FIG. 7 a schematic illustration of a composite brake disc before and after the reshaping, in a section that runs through the reference axis.

DETAILED DESCRIPTION OF THE INVENTION

Parts that are not essential for the understanding of the invention are, in part, not represented. The described embodiment examples are exemplary of the subject-matter of the invention or serve for its explanation and have no limiting effect.

FIGS. 1 to 5 each show a detail of a composite brake disc 10 which is being machined, in a section that runs through a reference axis A.

The composite brake discs 10 each include a brake disc chamber 1 and a brake ring 3, which are joined together and have been manufactured previously as separate parts.

The brake disc chamber 1 includes a tubular section 1$r$ and a base part 1$b$, which is connected to the tubular section. A reference plane E is defined by the base part. The reference axis A is perpendicular to the reference plane E.

The option of the tubular section 1$r$ having an outer profiling, e.g., an outer toothing and the brake ring 3 having a corresponding inner profiling, e.g., an inner toothing is indicated in a dotted manner in each of the FIGS. 1 to 5. A rotational securing of the braking ring 3 with respect to the brake disc chamber 1 can be reshaped by way of this.

An axial securing can be formed by axial stops 5, 5' and this securing prevents the brake disc chamber 1 and the brake ring 3 from being movable relative to one another along the reference axis A.

On joining together, the brake ring 3 can be pushed onto the tubular section 1$r$ and then be axially secured, so that finally both parts are fixedly connected to one another.

The brake ring 3 and the brake disc chamber 1 are in contact with one another in a fastening region, which in the embodiments according to FIGS. 1 to 5 extends from the axial stop 5 up to the axial stop 5'.

It can be the case that the braking surfaces 3$f$, 3$f$ are not aligned adequately parallel to the reference plane A in this condition. This is represented by the braking ring, which is drawn in a dashed manner. Too large a wobble angle $\alpha$, corresponding to too large a wobble t therefore exists. The section of FIGS. 1 to 5 runs in that plane, in which the wobble t is maximal (so that the wobble angle $\alpha$ can be represented in the plane). The wobble t and the wobble angle $\alpha$ have been represented in an exaggeratedly large manner in the FIGS. 1 to 5. Actual wobbles can be for example between 0.02 and 0.5 mm.

The braking ring in an optimal alignment, thus without wobble (i.e. with the wobble angle 0°), is represented in the FIGS. 1 to 5 by way of unbroken lines. The reference axis A then runs perpendicularly to the brake surfaces 3$f$, 3$f$.

The brake disc chamber 1 is reshaped in a defined manner, in order to reduce the wobble angle $\alpha$ and the (maximal) wobble t, which exist before the reshaping.

The brake disc chamber 1 can be reshaped by a symbolically represented tool 4. The brake disc chamber 1 can be held by a counter-holder 6 during this. In FIGS. 1 to 5, the tool 4 engages from the outside into the brake disc chamber 1, whilst the counter-holder 6 is arranged within the brake disc chamber 1. The reverse arrangement (counter-holder outside the brake disc chamber and tool engagement within the brake disc chamber) is likewise possible.

In FIGS. 1 to 4, the wall thickness of the brake disc chamber 1 is locally reduced in a reshaping region by way of the tool 4. The material of the brake disc chamber 1 can flow away (symbolised by the small arrows) due to the machining by way of the tool 4, so that an outer edge of the brake ring is moved away from the reference plane E in the azimuthal angle region of the reshaping. In FIGS. 1 to 5, an open arrow indicates the direction of the force that is exerted by the respective tool 4 upon the respective brake disc chamber 1, in order to effect the reshaping of the brake disc chamber 1. The direction of the force introduction can be, for example, perpendicular to the surface of the brake disc chamber in the reshaping region.

In an embodiment, the force introduction direction can be aligned within 30° perpendicularly to the machined surface of the brake disc chamber 1.

In FIG. 1, the reshaping takes place in a transition region from the base part 1$b$ to the tubular section 1$r$.

In FIG. 2, the reshaping takes place in the tubular section 1$r$. Furthermore, the reshaping in the case of FIG. 2 takes place in a region, in which the tubular section 1$r$ is provided with an outer toothing.

In FIG. 3, the reshaping takes place in the tubular section 1$r$. Furthermore, in the case of FIG. 3, the reshaping takes place outside a region, in which the tubular section 1$r$ is provided with an outer toothing.

In FIG. 4, the reshaping takes place in an angled transition region between the base part 1$b$ and the tubular section 1$r$.

An indentation is produced locally in the brake disc chamber 1 by way of a tool 4 in FIG. 5. The counter holder 6 only supports the brake disc chamber 1 outside the reshaping region that is machined by the tool 4. Material of the brake disc chamber 1 is quasi pulled together (symbolised by small arrows) in the region of the indentation, so that an outer edge of the brake ring is moved towards the reference plane E in the azimuthal angle region of the reshaping.

The degree of the deformation, to which the brake disc chamber 1 is subjected (in the azimuthal region of maximal reshaping) can lie for example in the range of 0.01 mm to 2 mm.

A deformation pattern, which varies with the azimuthal angle (thus over a circumferential coordinate), is produced for minimising the wobble.

FIGS. 6A to 6 C illustrate different deformation patterns in a view along the reference axis. The dashed line symbolises the azimuthal directions of the maximal wobble. The larger or thicker the black surface, the greater is the reshaping in the corresponding azimuthal region. As is represented in FIGS. 6A to 6C, the deformation patterns can lie mirror-symmetrically to a plane, in which the wobble angle lies.

FIG. 6A illustrates a deformation pattern which represents a continuous deformation. Such a deformation pattern can be produced for example in a single reshaping step. Alternatively, it can be produced by a multitude of successively executed (part-) reshaping steps, FIGS. 6B and 6C illustrate sectoral deformation patterns that are composed of a plurality of individual reshapings in different azimuthal angle regions. On the one hand the minimal and on the other hand the maximal deformation degrees are present in an angular region around the azimuthal directions (shown dashed) of the maximal wobble.

Since the angle between the tube axis R of the tubular section 1r and the reference axis A and which is indicated as the tilt angle β is not easily recognised in FIGS. 1 to 5, FIG. 7 illustrates this as well as the wobble angle α with a greatly exaggerated size. FIG. 7 is greatly schematised. The tilt angle β and the wobble angle α are actually very small angles, smaller than 0.2°, e.g. a few hundredths of a degree, and are therefore difficult to measure.

The arrows, which are indicted at r1 and r2 are the radial directions, in whose region plastic deformations for the alignment of the brake ring 3 are minimal and maximal respectively, since the wobble t is at a maximum there. A sensor, by way of which the wobble t can be quantified, so that the deformation pattern can be selected (computed) in dependence on this, is indicated at 11.

Various reshaping techniques can be applied for carrying out the reshaping, e.g. cold forming techniques. Some possible reshaping techniques are mentioned further above.

The invention claimed is:

1. A method for manufacturing a composite brake disc comprising a brake ring with at least one braking surface and a brake disc chamber comprising a tubular section and a base part, the base part being connected to the tubular section and defining a reference plane, comprising the steps of:
   joining the brake disc chamber and brake ring, and
   subsequently, reducing a wobble angle between the at least one braking surface and the reference plane by reshaping the brake disc chamber.

2. The method according to claim 1, wherein a reference axis, which is perpendicular to the reference plane, is defined by the base part, and a tube axis is defined by the tubular section, and a tilt angle between the tube axis and the reference axis is changed by the reshaping of the brake disc chamber.

3. The method according to claim 1, wherein the brake ring is in contact with the tubular section in a fastening region after the joining together, and wherein the reshaping of the brake disc chamber takes place within an axial region which extends from the base-part-side end of the fastening region up to and including the base part.

4. The method according to claim 1, wherein the reshaping of the brake disc chamber takes place within a transition region between the base part and the tubular section.

5. The method according to claim 1, wherein a degree of the reshaping of the brake disc chamber varies along a circumferential coordinate.

6. The method according to claim 1, wherein the reshaping comprises the brake disc chamber being plastically deformed by at least one tool.

7. The method according to claim 1, wherein the reshaping comprises at least one indentation being produced in the brake disc chamber.

8. The method according to claim 1, wherein the reshaping comprises a wall thickness of the brake disc chamber being locally reduced.

9. The method according to claim 1, wherein a measure for a wobble of the at least one braking surface relative to the reference plane is determined by means of a sensor, and the reshaping of the brake disc chamber is carried out in dependence of the determined measure.

10. The method according to claim 1, wherein the tubular section comprises an outer profiling, and the brake ring comprises a corresponding inner profiling, and wherein the outer profiling and the inner profiling mesh into one another for forming a rotational securing.

11. A composite brake disc, comprising a brake ring with at least one braking surface, and a brake disc chamber comprising a tubular section and a base part, the base part being connected to the tubular section and defining a reference plane and a reference axis, which is perpendicular to the reference plane, wherein the brake disc chamber comprises a deformation pattern that, in a region of a first radial direction, comprises deformations of the brake disc chamber of a maximal degree, and comprises, in a region of a second radial direction, which is opposite to the first radial direction, deformations of the brake disc chamber of a minimal degree and comprises in regions of radial directions that lie between the first and the second radial directions, deformations of the brake disc chamber of degrees decreasing with an increasing angular distance from the first direction, down to the minimal degree, wherein radial directions are directions running perpendicularly to the reference axis, and wherein the minimal degree is zero or is different from zero.

12. The composite brake disc according to claim 11, wherein the first radial direction and the second radial direction lie in a plane comprising a tilt angle.

13. The composite brake disc according to claim 11, wherein the deformation pattern comprises an indentation in the brake disc chamber.

14. The compose brake disc according to claim 11, wherein the deformation pattern comprises at least one region of a reduced material thickness of the brake disc chamber.

* * * * *